US008445062B2

(12) United States Patent
Scranton, Jr.

(10) Patent No.: US 8,445,062 B2
(45) Date of Patent: May 21, 2013

(54) METHOD FOR PRODUCING METAL OXIDE COMPOSITIONS AND COATED SUBSTRATES

(75) Inventor: Delbert C. Scranton, Jr., Chesterfield, MO (US)

(73) Assignee: Scutter Enterprise, L.L.C., Chesterfield, MO (US)

( * ) Notice: Subject to any disclaimer, the term of this patent is extended or adjusted under 35 U.S.C. 154(b) by 1275 days.

(21) Appl. No.: 11/844,196

(22) Filed: Aug. 23, 2007

(65) Prior Publication Data

US 2008/0145704 A1  Jun. 19, 2008

Related U.S. Application Data

(60) Provisional application No. 60/823,482, filed on Aug. 24, 2006.

(51) Int. Cl.
*B05D 7/00* (2006.01)
(52) U.S. Cl.
USPC .......................................... 427/212; 427/215

(58) Field of Classification Search
USPC ....................... 427/212, 336, 215; 423/242.1, 242.01–242.09, 244.1, 244.11
See application file for complete search history.

(56) References Cited

U.S. PATENT DOCUMENTS

| | | | | |
|---|---|---|---|---|
| 3,301,250 A | * | 1/1967 | Glasser | 126/263.02 |
| 4,205,957 A | * | 6/1980 | Fujiwara | 44/250 |
| 4,338,098 A | * | 7/1982 | Yamaji | 44/251 |
| 6,578,715 B2 | * | 6/2003 | Scranton et al. | 210/505 |
| 2005/0137409 A1 | * | 6/2005 | Ashtekar et al. | 552/293 |

FOREIGN PATENT DOCUMENTS

WO  WO 9103422 A1 * 3/1991

* cited by examiner

*Primary Examiner* — Michael Cleveland
*Assistant Examiner* — Tabatha Penny
(74) *Attorney, Agent, or Firm* — Polsinelli Shughart PC

(57) ABSTRACT

The present invention generally relates to a process for making a metal oxide composition. The present invention also relates to a process for making a coated metal oxide substrate.

23 Claims, 14 Drawing Sheets

METHOD FOR PRODUCING METAL OXIDE COMPOSITIONS AND COATED SUBSTRATES

CROSS-REFERENCE TO RELATED APPLICATION

This application claims priority from Provisional Application Ser. No. 60/823,482 filed on Aug. 24, 2006, which is hereby incorporated by reference in its entirety.

FIELD OF THE INVENTION

The present invention generally relates to process for making a single or mixed metal oxide composition powder. The powder includes oxides of metals, basic metal or metals, insoluble and soluble metal salts, and combinations thereof. Resultingly, a tightly-adhered coated metal oxide, basic metal, or metal salt composition is formed. By oxidizing the basic metal powder(s) along with other additives such as other basic metal powders, metal oxide powders, and metal salts, the additives are incorporated into the resulting metal oxide composition powder and become part of the tightly adhered coating when substrates are used. The process for formation requires agitation or mixing of the constituents without the need for heating, drying, or added processes, such as calcining or forming of the product for use. The invention can be used to treat fluid streams whereby the resulting metal oxide composition can react with contaminants in a fluid stream comprised of gasses, liquids, and slurries.

BACKGROUND OF THE INVENTION

Natural and synthetic metal oxide compositions, such as iron oxide, have been used for a variety of applications. For example, it is well known to use of metal oxides, particularly iron oxide ($Fe_xO_y$) and ZnO, in a reactor bed to remove contaminants, typically sulfur compounds, such as hydrogen sulfide ($H_2S$), from fluids, typically gas streams. Sulfur compounds are removed from fluids because they are known contaminants, which potentially make gas streams or other fluids unsalable. Other uses of metal oxides and basic metals includes the removal of arsenic, radioactive isotopes, and halogenated hydrocarbons from water. Metal oxides are also used in a wide range of catalytic processes for chemical production and contaminant removal from various fluids, such as, but not limited to, sulfur compounds, $NO_x$ and $SO_x$, $CO_2$.

There are a several processes used for making metal oxides from water-soluble metal salts including hydrothermal synthesis, hydrothermal precipitation, flame hydrolysis, or thermal decomposition. All of these processes, however, include multiple manufacturing steps that can be both costly and time intensive. For example, hydrothermal synthesis includes mixing an iron salt with a base solution, heating the solution with hot water, feeding the solution into a reactor for a sufficient amount of time to produce metal oxide particles, cooling the mixture, separating the metal oxide from the remaining solution, and drying the metal oxide particles. Flame hydrolysis includes vaporizing a metal halide and transporting it in an inert gas into an oxy-hydrogen flame. The metal halide salt decomposes in the water producing flame to produce a metal oxide.

Currently, powder coated metal oxide on substrates are used in flow-through packed-bed processes to react with and scavenge hydrogen sulfide and thiols (mercaptans) present in natural gases and liquid hydrocarbons. There are several processes used to make loosely-adhered powdered metal oxide moistened on substrates. Other processes require binding the metal oxide to a substrate with an adhesive or, calcining or drying a metal oxide mixture onto a substrate. These processes include various manufacturing steps that can be both costly and time intensive. The process of binding the metal oxide to a substrate with an adhesive or binding agents includes, for example, admixing zinc oxide with adhesives and processing the mixture into pellets, spheres, or flakes by extrusion. The calcining process includes soaking a substrate multiple times in soluble metal oxide solutions and calcining or drying to create a specific metal oxide content on the substrate. As such, processes for making a metal oxide composition that is a tightly-adhered coated metal oxide composition substrate and includes fewer manufacturing steps is desired.

The resultant loosely-adhered powdered metal oxide coated substrates currently being produced by simple moistening of the powdered metal oxide on a substrate described in the above processes also have several problems. For example, depending on the adhesive used, if any, to bind the coated metal oxide to the substrate, the coating may degrade or separate from the substrate thereby becoming less effective in the removal of contaminants from fluids. In addition, the moistened powdered metal oxides on substrates produced by current processes have limitations as to the amount of metal oxide that can be coated onto the substrate. Typically, the processes are limited to less than 20% by weight metal oxide content on each substrate. The substrate must be carefully selected as the substrate can be important in maintaining the moistened powder metal oxide on the substrate. Many granular substrates are not suitable as they release the powdered metal oxide from the substrate during storage, drying, or when exposed to excessive moisture. Finally, it is believed that the hardness of the powdered metal oxides wetted on substrates currently is limited to substrates that are already hard and are not further softened by moisture. The substrate hardness is necessary to ensure the final product has sufficient crush strength to be used in a packed bed. This means it is difficult to make a coated product from a lightweight substrate, such as vermiculite and perlite. Additionally, nonporous substrates cannot be used as they resist moistening that allows the metal oxide powder to attach and stick on the substrate. Also, most moisture sensitive substrates like calcium chloride are unavailable. Typically, use of such substrates results in a product that does not maintain its stability in packed-bed reaction vessels. As such, a process for coating a wide variety of substrates that can achieve a high metal oxide content is desired. It is also desired to have a metal mixture on a substrate that is not easily removed.

SUMMARY OF THE INVENTION

The present invention relates to processes for making a metal oxide composition and a tightly-adhered metal oxide composition coated substrate. The process for making a metal oxide composition typically includes contacting a metal salt, a metal powder in a zero valence state or basic metal powder, and a sufficient amount of water to initiate an oxidizing reaction between the metal salt and metal powder, without allowing the mixture to become a slurry or solution. Also, other metal powders, metal oxides, and other additives may be added to create the metal oxide composition.

Typically, the process includes contacting a metal salt, with a solvent, such as water, to create a metal salt mixture. The metal salt can be soluble or dispersible in water. Next, a sufficient amount of the metal salt mixture is reacted with a metal powder, such as iron powder, to initiate an oxidizing reaction between the metal powder and the metal salt mixture thereby forming the metal oxide composition. Typically, the ratio of metal powder to metal salt mixture is from about 1:2 to about 50:1 by weight. The resultant metal oxide composition is a free-flowing, i.e. non-clumping powder, that is ready for use without further processing or drying. Other additives, such as other basic metals, metal oxides, can be incorporated into the metal oxide composition by mixing with the metal powder to be oxidized before the metal salt mixture is added. Additionally, this process allows the use of byproducts of other processes and recovered waste materials as the basic metal powder, metal salt, other additives or combinations thereof.

Essentially, the same process can achieve the same results by dry mixing the metal salt with the metal powder and other additives, followed by adding a small amount of solvent to initiate the oxidizing reaction. This can be done alone or in the presence of a substrate whereby the metal oxide composition forms primarily on and somewhat inside the substrate depending on the porosity of the substrate creating a tightly bound metal oxide composition on almost any substrate. Additionally, the basic metal powder and other additives, such as non-reactive metal powders or other metal oxides and other powders, can be mixed along with a substrate, whereby the substrate may be pre-moistened with solvent and then the metal salt solution or slurry in water is added and mixed. Depending on the degree of porosity of the substrate, the metal oxide composition coats and penetrates substrates with greater porosity and coats the outside of substrates with little or no porosity. When soft substrates that are easily crushed before treatment, such as granular vermiculite or perlite, are subjected to the formation of the metal oxide composition on the substrate, the resulting metal oxide composition coating hardens the treated granular product allowing it to be used in packed-bed filters for treatment of fluids without degradation or softening.

The process for making the metal oxide composition is performed at ambient conditions and only requires agitation. The resultant metal oxide composition may be used as is to remove contaminants, such as sulfur compounds from a fluid, or, the composition can be coated onto a substrate prior to use.

The present invention also relates to a process for making a tightly-adhered and penetrated coated metal oxide substrate, wherein the substrate includes up to about 75% by weight metal oxide composition. Typically, this process includes contacting a metal salt, a metal powder in a zero valence or basic state, and a sufficient amount of water or solvent to initiate an oxidizing reaction between the metal salt and metal powder, as described above. The metal salt and metal powder mixture oxidation is initiated and then the oxidizing mixture is contacted with a substrate, such as lime or calcined montmorillonite, and a sufficient amount of moistening agent, such as water, alcohol, or other liquids. The moistening agent is used to evenly distribute the metal oxide composition over the surface of the substrate as it oxidizes and form a tightly-adhered coating primarily on and somewhat within the substrate. This process is performed at ambient conditions and only requires agitation or mixing. The moistening with a second solvent wets the substrate, allowing the oxidizing metal powder to adhere to the substrate while continuing the oxidation process. Typically, the coated metal oxide substrate is allowed to complete the oxidation process at ambient conditions, with the process generally taking between 15 minutes and 24 hours. Formation depends on the speed of oxidation, amount and strength of metal salt, and formation of the coating on the substrate.

The resultant tightly-adhered coated metal oxide composition on a substrate may be used to remove contaminants, such as sulfur compounds, $NO_x$, $SO_x$, $CO_2$, and arsenic, heavy metals, halogenated compounds and radioactive compounds from fluids. The resultant coated metal oxide substrate has a metal oxide content of from about 1% to about 75% by weight, thereby having the capability of a higher amount of reactive material than current coated metal oxide substrates. Lightweight substrates can be selected to allow a density of less than about 1 gram per cubic centimeter with 20% or more metal oxide content. The tightly-adhered coating on the lightweight substrate, such as vermiculite or perlite, becomes sufficiently hardened to support the granular packed bed depths of 3 feet or more into the reaction vessel without collapse or degradation of the granular material under its own weight which causes plugging. Additionally, this tightly-adhered metal oxide coating on a substrate by this process allows much higher fluid flow through a granular bed without degradation or stripping of metal oxide powder by the fluids as experienced with loosely-adhered simple metal oxide powder moistened on substrate. In particular, the metal oxide composition coats the substrate to form a coated product. This means the product essentially forms a continuous shell or coating around the substrate, that can withstand a flow rate of water at 3.0 inches/minute in a packed reactor vessel Other powders, such as basic metals, metal oxides, and powdered additives can be incorporated or mixed with the initiated oxidizing metal oxide mixture and moistened onto a substrate together whereby the additive powder is incorporated into the tightly-adhered coating on the substrates in small amounts of powder additive to basic metal ratios of up to 5 to 1 powdered additive to oxidizing metal oxide mixture respectively.

Additionally, multiple coatings of the same or different metal oxide compositions can be placed on a substrate. Also, used metal oxide compositions on substrates can be easily re-coated and used again for the same purpose or in another contaminant removal process.

REFERENCE TO COLOR FIGURES

The application file contains at least one photograph executed in color. Copies of this patent application publication with color photographs will be provided by the Office upon request and payment of the necessary fee.

DETAILED DESCRIPTION OF THE INVENTION

Figure 1:
FIG. 1A depicts the formation of an iron oxide composition by treating 150 g of basic iron powder with a mixture of 20 g of water and 5 g of copper chloride dihydrate ($CuCl_2$-$2H_2O$) for 1 hour.
FIG. 1B depicts that treating 150 g of basic iron powder with a mixture of 20 g of water and 5 g of sodium chloride (NaCl) for 1 hour, the sodium chloride did not oxidize the iron powder.
FIG. 1C depicts that treating 150 g of basic iron powder with 20 g of water after 1 hour wherein the iron powder was not oxidized.
Figure 2:
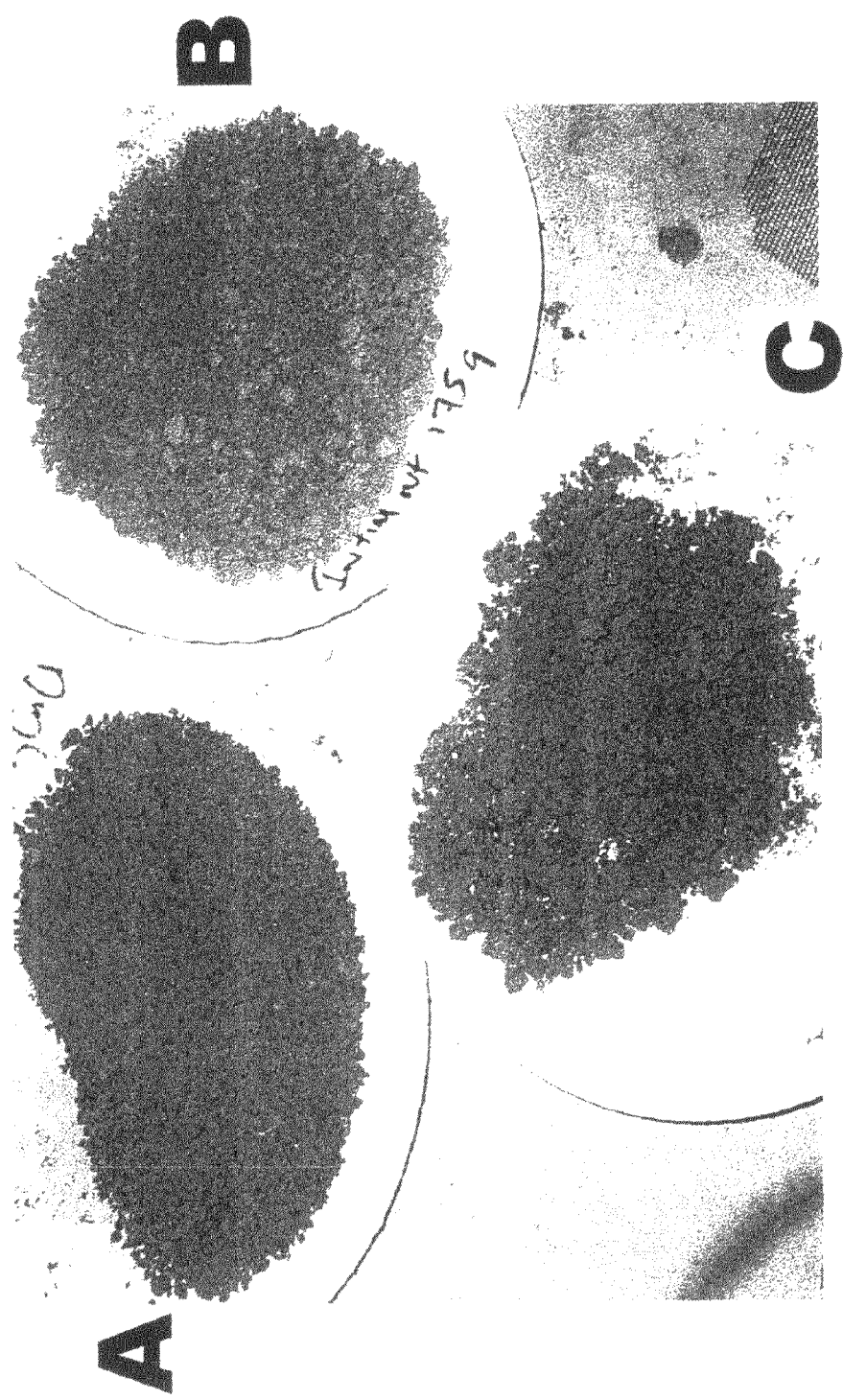
FIG. 2A depicts the formation of an iron oxide composition by treating 150 g of basic iron powder with a mixture of 20 g of water and 5 g of $CuCl_2$-$2H_2O$ for 6 hours.
FIG. 2B depicts treating 150 g of basic iron powder with a mixture of 20 g of water and 5 g of NaCl for 6 hours whereby the iron powder did not oxidize.
FIG. 2C depicts that treating 150 g of basic iron powder with 20 g of water after 6 hours whereby the iron powder did not oxidize.
Figure 3:
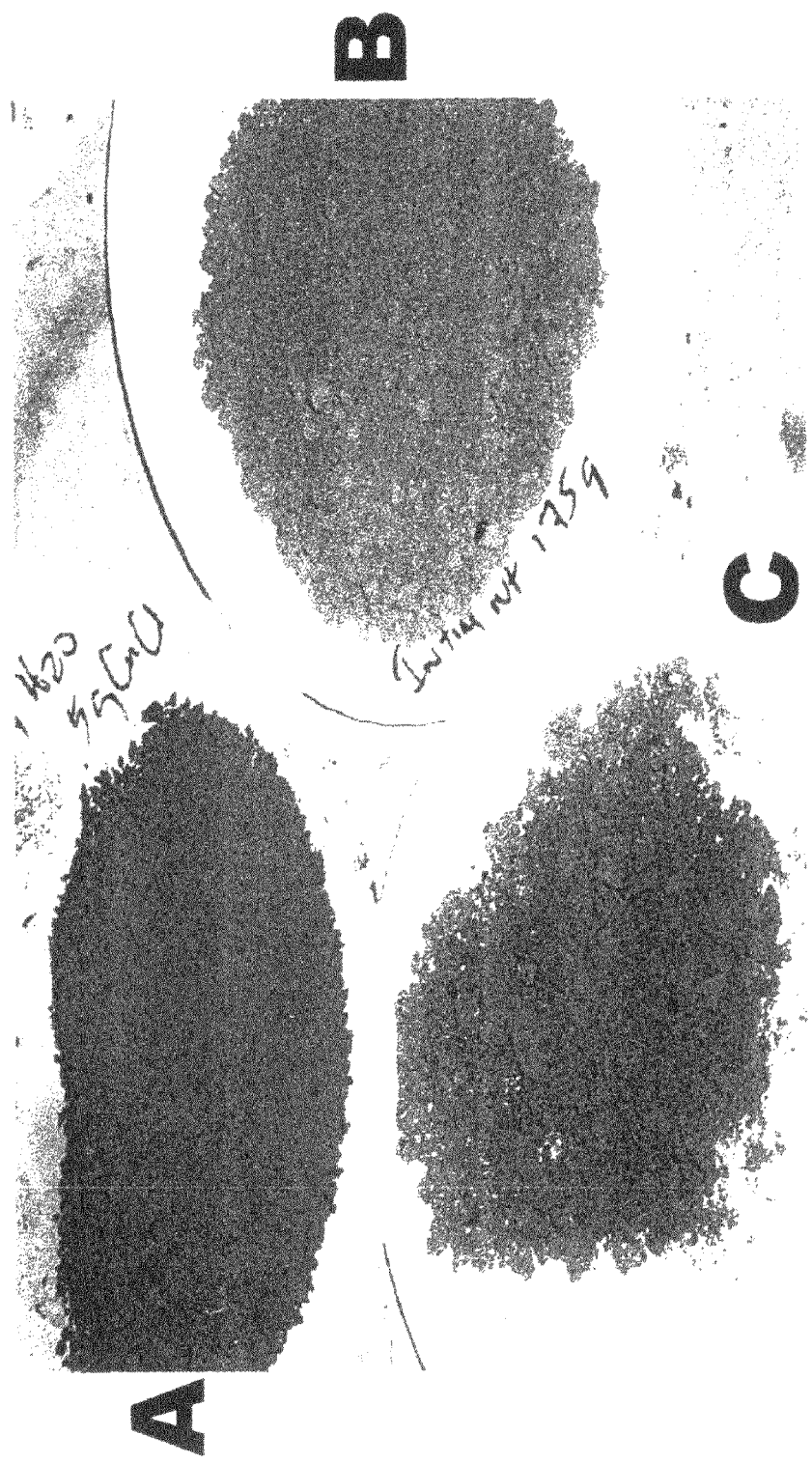
FIG. 3A depicts the formation of an iron oxide composition by treating 150 g of basic iron powder with a mixture of 20 g of water and 5 g of $CuCl_2\text{-}2H_2O$ for 24 hours.
FIG. 3B depicts that treating 150 g of basic iron powder with a mixture of 20 g of water and 5 g of NaCl for 24 hours whereby the iron powder did not oxidize.
FIG. 3C depicts that treating 150 g of basic iron powder with 20 g of water whereby after 24 hours the iron powder did not oxidize.
Figure 4:
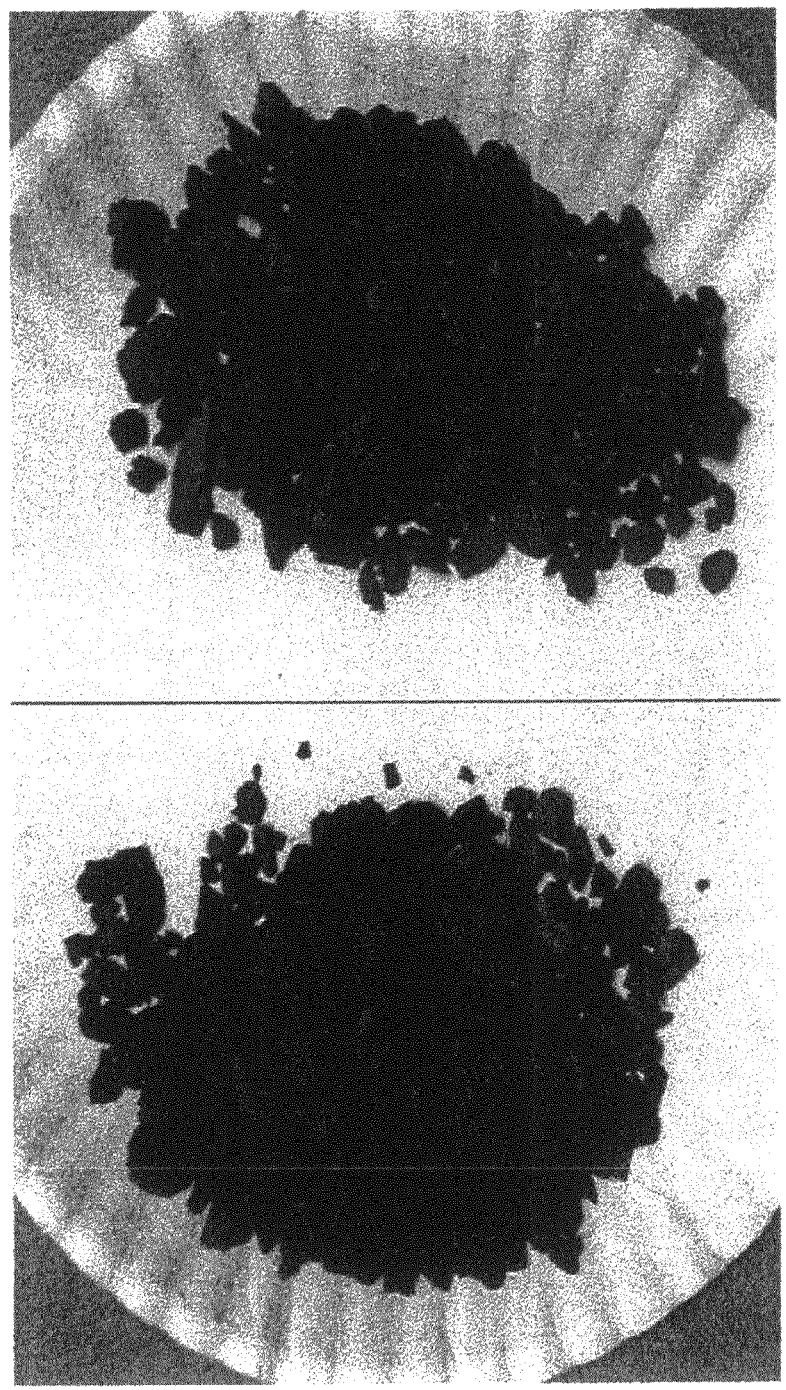
FIG. 4A depicts raw granular carbon.
FIG. 4B depicts raw granular carbon coated with iron oxide as described in Example 1.
Figure 5:
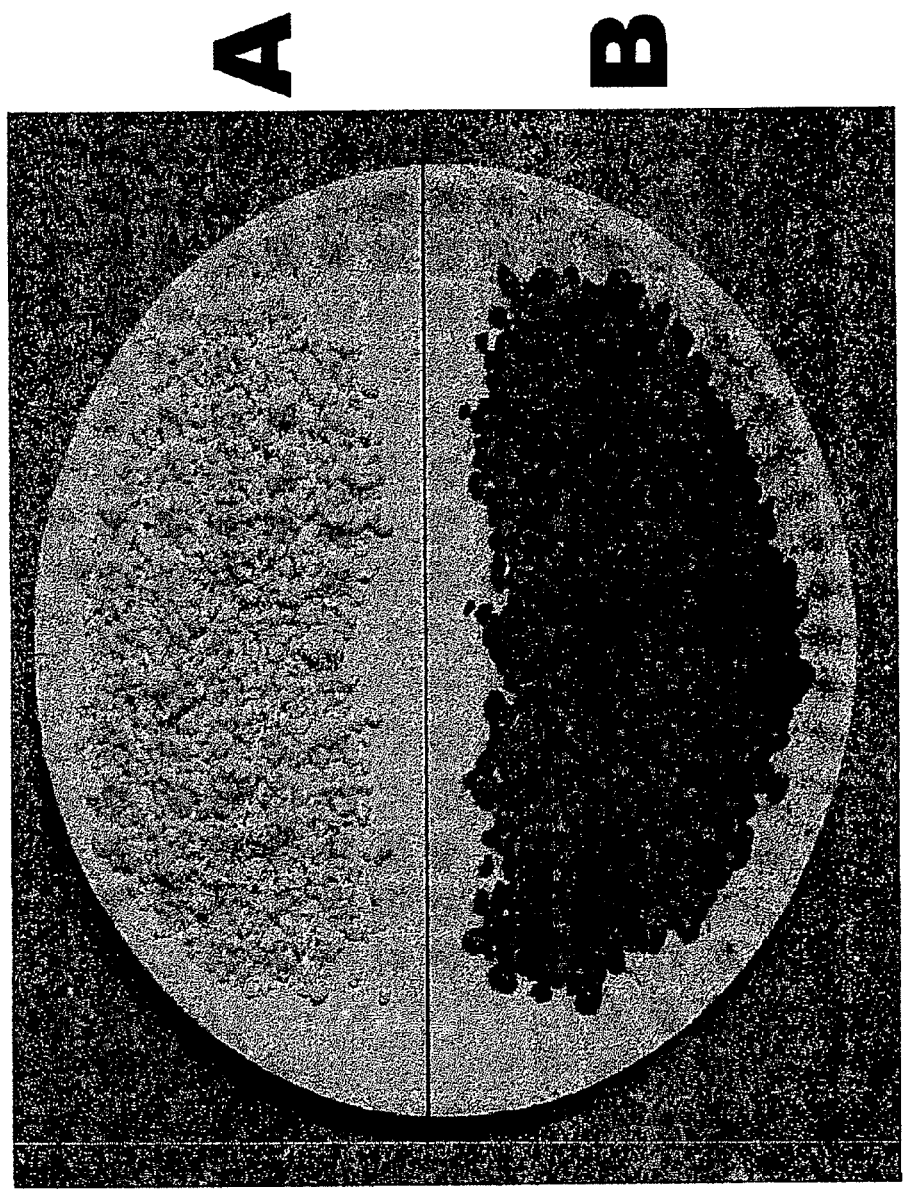
FIG. 5A depicts granular vermiculite.
FIG. 5B depicts granular vermiculite coated with iron oxide as described in Example 2.
Figure 6:
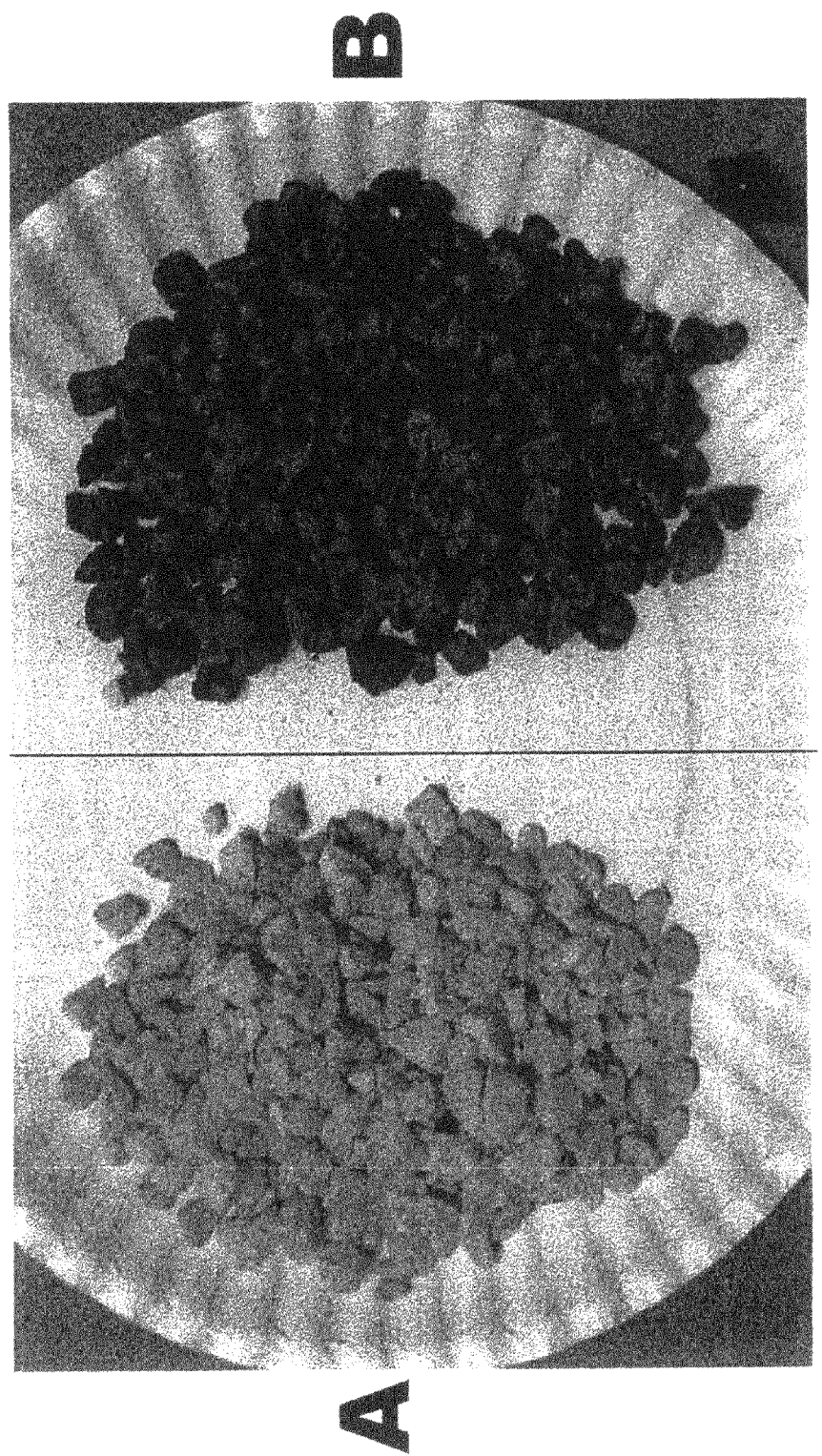
FIG. 6A depicts crushed rock.
FIG. 6B depicts crushed rock coated with iron oxide as described in Example 3.
Figure 7:
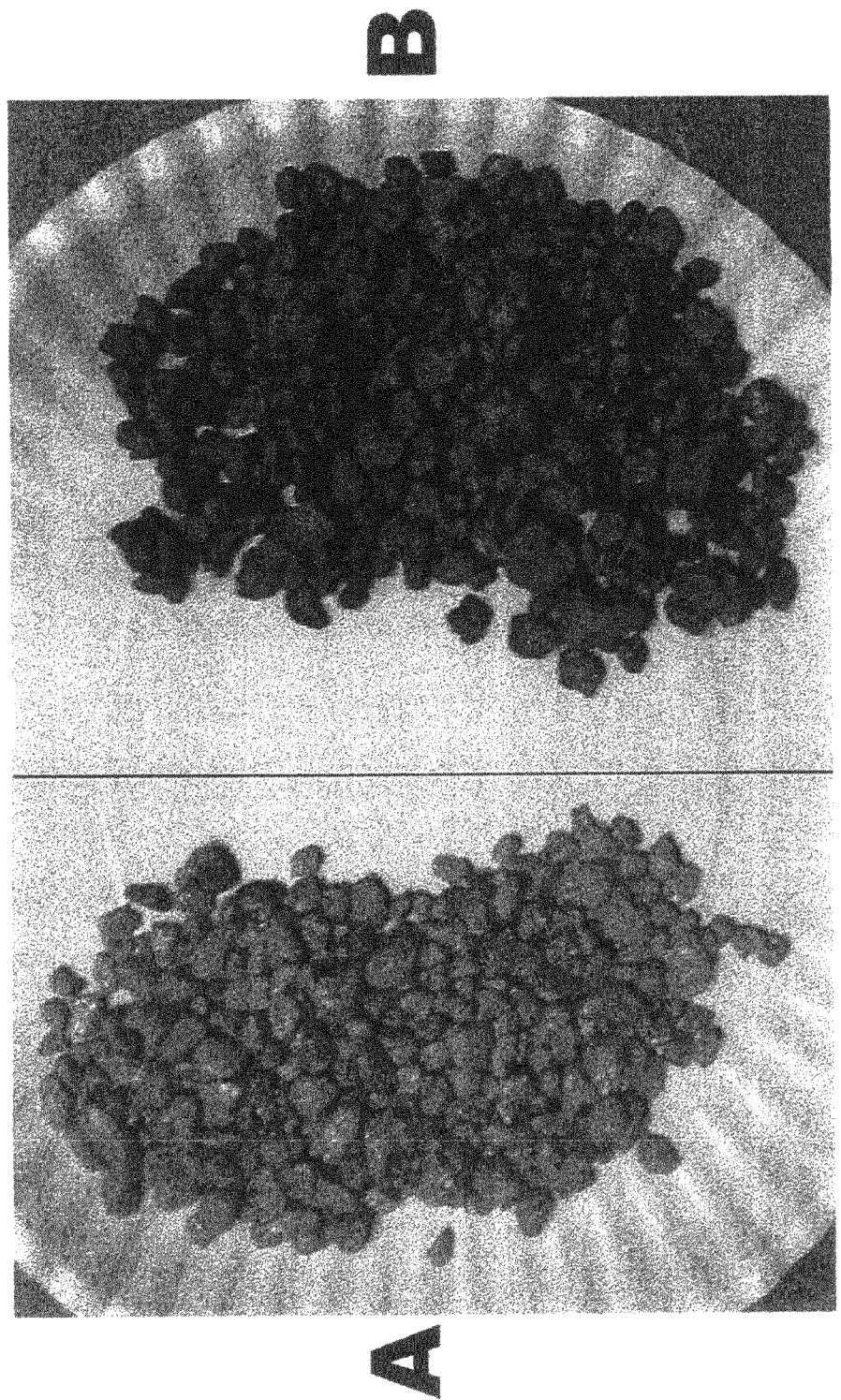
FIG. 7A depicts polished rock.
FIG. 7B depicts polished rock coated with iron oxide as described in Example 4.
Figure 8:
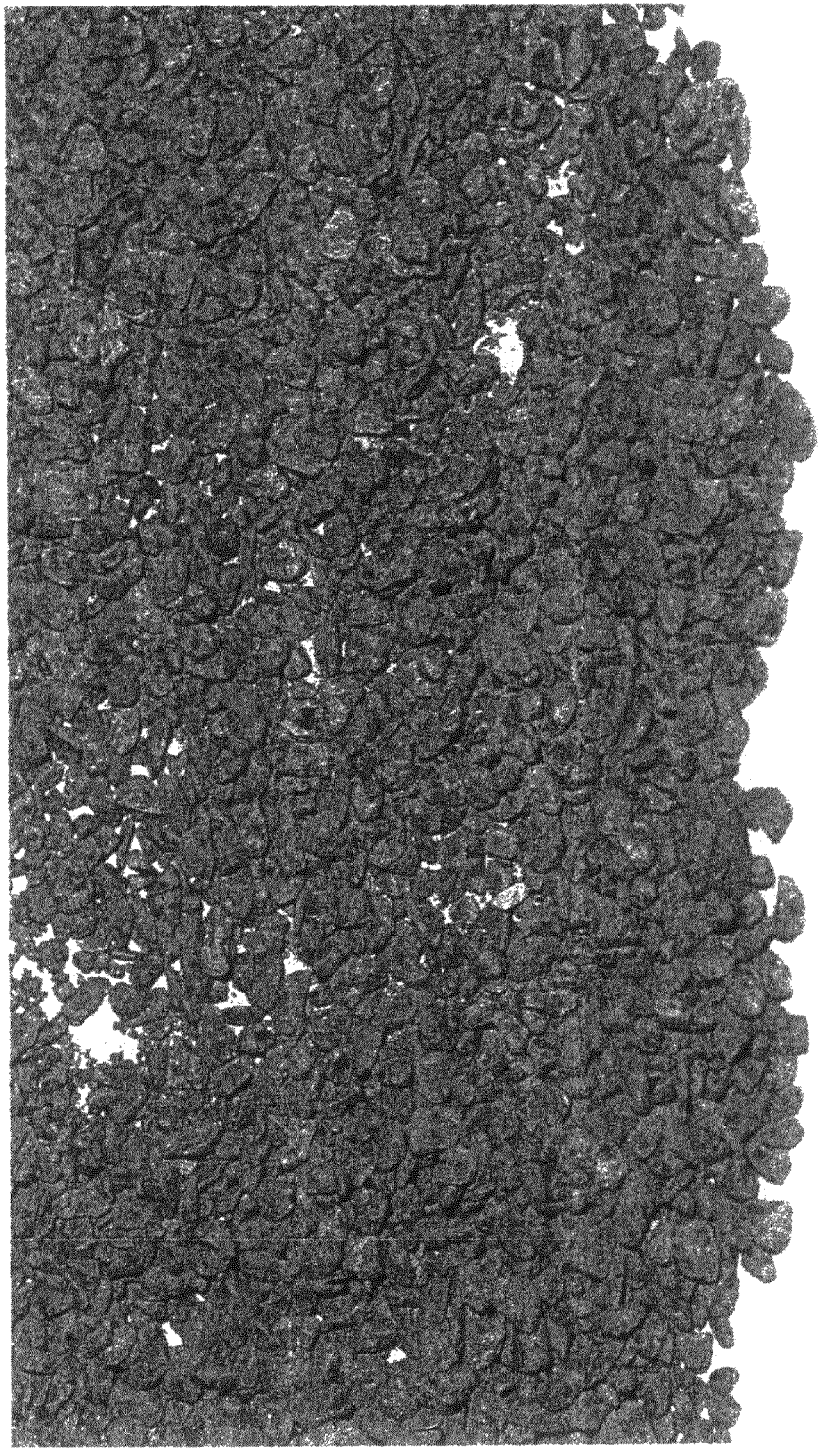
FIG. 8 depicts calcined clay coated with iron oxide as described in Example 5.
Figure 9:
FIG. 9 depicts the iron oxide coated calcined clay after reacting it with $H_2S$ as described in Example 5.
Figure 10:
FIG. 10 depicts the re-coated iron oxide calcined clay as described in Example 7.
Figure 11:
FIG. 11 depicts the iron oxide coated wood as described in Example 10.
Figure 12:
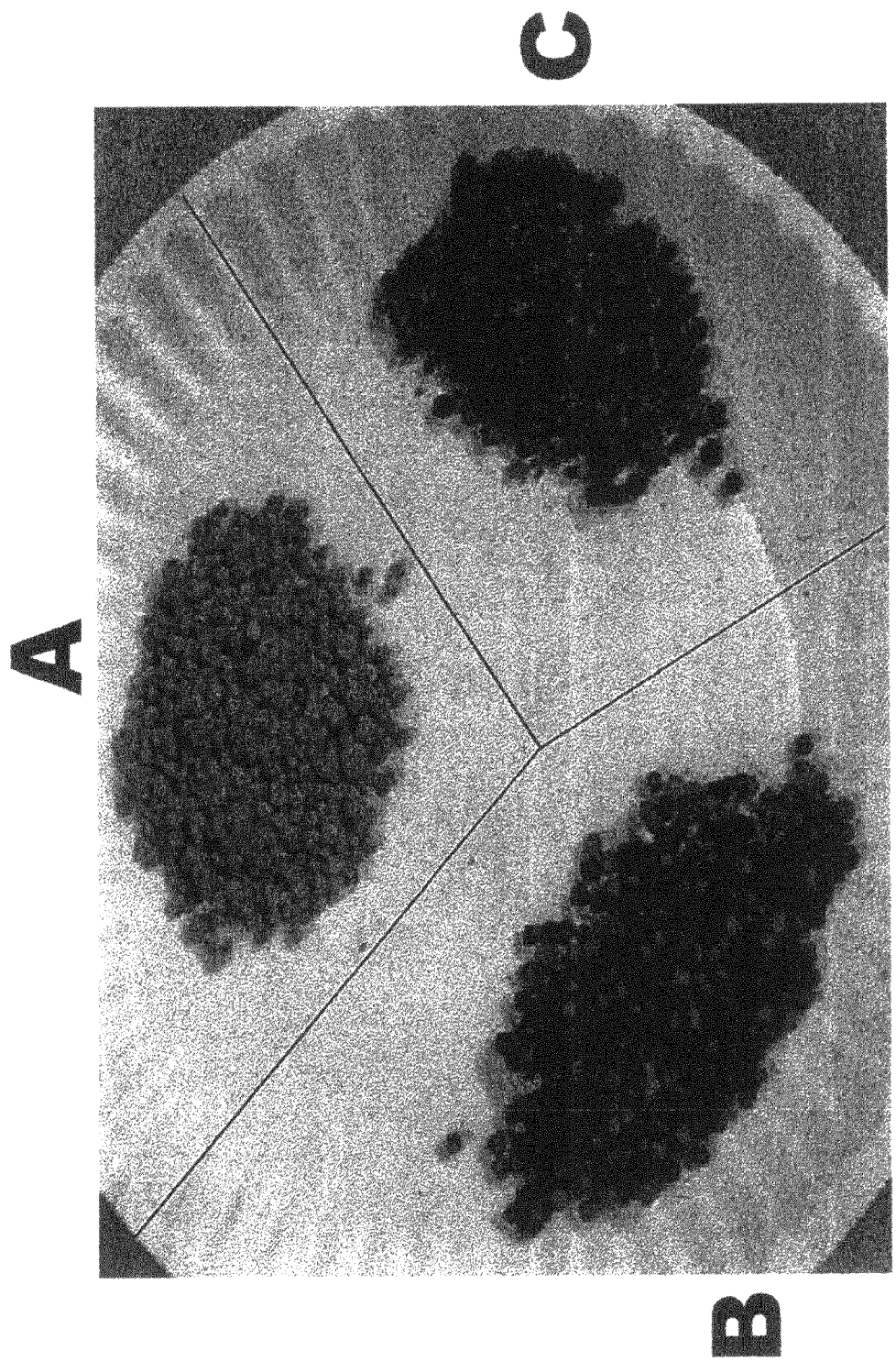
FIG. 12A depicts the zinc oxide coated lime as described in Example 11A.
FIG. 12B depicts the iron oxide coated calcium chloride as described in Example 11B.
FIG. 12C depicts the iron oxide coated lime as described in Example 11C.
Figure 13:
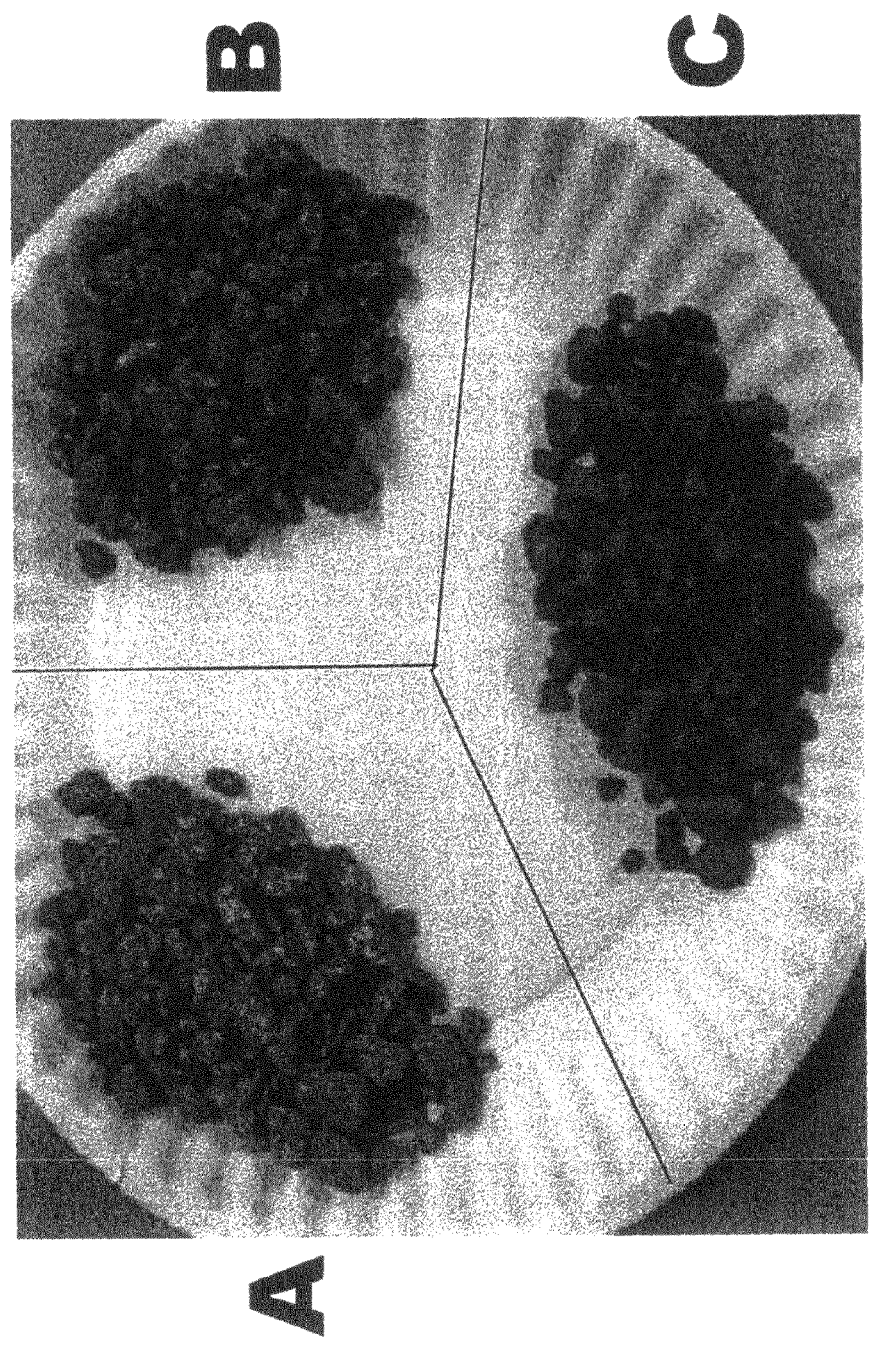
FIG. 13A depicts the iron oxide/zinc oxide coated calcined clay described in Example 13A.
FIG. 13B depicts the iron oxide/zinc oxide coated calcined clay described in Example 13B.
FIG. 13C depicts the iron oxide/zinc oxide coated calcined clay described in Example 13C.
Figure 14:
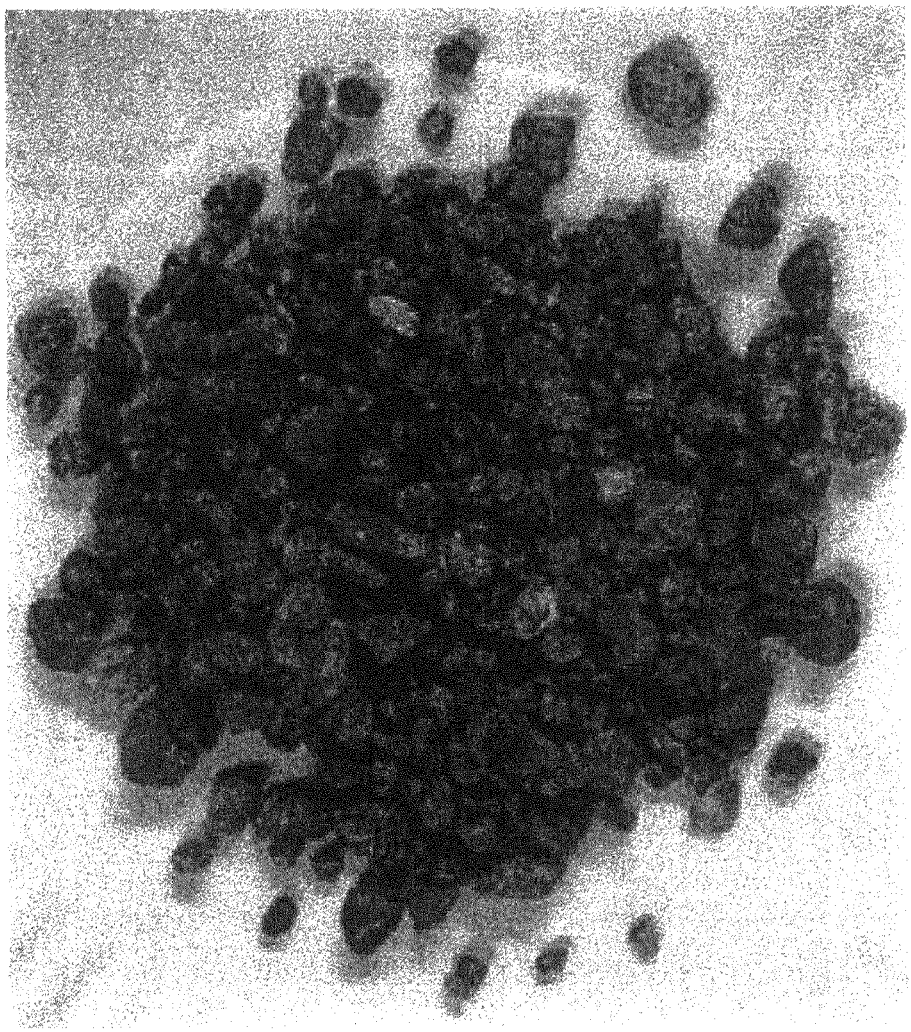
FIG. 14 depicts the tin oxide/iron oxide coated calcined clay described in Example 13D.

The present invention relates to a process for making a metal oxide composition that is a substantially formed at dry ambient conditions within between about 15 minutes and about 24 hours. The composition is formed by reacting the metal salt mixture and basic metal powder together, with or without other additives, to form a free-flowing, non-clumping, powder.

The present invention also relates to a process for making a tightly-adhered metal oxide composition formed from a metal/metal-oxide/additive, coating on a substrate having a metal oxide composition content of up to 75% by weight. The resultant coated metal oxide composition on a substrate may be used to remove contaminants, such as sulfur and heavy metal compounds, from fluids. Additionally, multiple coatings can be made of the same or different metal oxide compositions on substrates. The substrates can be optionally recoated with the metal oxide composition so that, in effect, the composition is re-coated and used again. This can reduce the quantity of product disposed of in a landfill thereby protecting the environment and reducing cost by substituting used material for new substrates.

I. Metal Oxide Composition

The process for making a metal oxide composition can be initiated by contacting an amount of a metal salt with an amount of an aqueous solvent to form a metal salt mixture or slurry. Any of a variety of metal salts may be used in the present invention. As used herein, a metal salt is a metal of any chloride, carbonate, sulfate, acetate, nitrate, chelate, phosphate, oxide, and combinations thereof. As mentioned a metal powder may also be mixed in. The metal ion of the metal salt may be any metal, however, it is preferred for the metal to have an equal or higher than electropotential as compared to the basic metal of the metal powder. The metal ion includes platinum, gold, silver, copper, cadmium, nickel, zinc, palladium, lead, chrome, iron, titanium, manganese, magnesium, tin, cobalt, or mixtures thereof. For example, the metal salt may be copper chloride, ferric chloride, sodium chloride, silver nitrate, copper sulfate, cobalt acetate, nickel-cobalt sulfate, zinc phosphate, iron phosphate and nickel phosphate. The aqueous solvent that is contacted with the metal salt may be selected from the group consisting of water, or a water/alcohol mixture. For example, the alcohol may be glycol or isopropanol.

Any method of mixing the metal salt and the solvent may be used so long as the two are thoroughly mixed and the metal salt is at least partially solubilized or disperses in the initial solvent. For example, a metal salt, such as copper chloride dihydrate, may be contacted with water, in any suitable vessel, at ambient conditions, and agitated to partially or fully dissolve the metal salt. Typically, the ratio of metal salt to solvent when making the metal salt mixture is from about 4:1 to about 1:4 by weight. Generally, the metal salt and solvent are contacted for from about 10 seconds to about 90 minutes mixed in a continuous process to form a solution or dispersion in the solvent.

Once the metal salt mixture has been prepared, a sufficient amount of the metal salt mixture is reacted with a metal powder, in a zero valence or basic state, to initiate an oxidizing reaction between the metal powder and the metal salt mixture thereby forming a metal oxide composition. The amount of solvent in the metal oxide composition is limited so that the metal oxide composition does not become a slurry or solution, essentially, no free moisture is present. Rather, the resultant metal oxide composition is a free-flowing, or non-clumping powder that is ready for use without further processing or drying.

As used herein, the metal powder may be any metal powder that is in a zero valence state, i.e. non-oxidized state. The metal used may come from a wide variety of sources, including semi-processed metal, scrap metal, reduced foundry dust, and byproducts of metal working facilities, all which reduce costs, waste, or disposal of materials. Suitable types of metals that may be used include one or more metals or metalloids selected from the group consisting of a group 1A element, a group 2A element, a group 1B element, a group 2B element, a group 3B element, a group 4B element, a group 5B element, a group 6B element, a group 7B element, a group 8B element, a group 3A element, a group 4A element, a group 5A element, a group 6A element, and combinations thereof. Alternatively, the metal powder may be an alloy of the above metals. Suitable metal powders, for example, include iron powder, zinc powder, tin powder, nickel powder, aluminum powder, antimony powder, chrome, and combinations thereof. Typically, the metal powder has an average diameter of less than about 2 mm. Alternatively, the metal powder has an average diameter of less than about 1 mm.

Any method of reacting the metal salt mixture and the metal powder may be used so long as the two are thoroughly mixed and an oxidizing reaction occurs between the metal salt mixture and the metal powder. When the solution is added it is preferred for a slurry or solution to not be formed. Throughout the oxidizing process, the metal powder heats and expands as it oxidizes to a partial or complete metal oxide powder, or composition. For example, the metal salt mixture may be reacted with a metal powder, such as iron powder, in a suitable vessel having an agitation device such that the metal salt mixture and metal powder are thoroughly mixed and an oxidation reaction is initiated. Typically, the reaction is conducted at ambient conditions and in a ratio of metal powder to metal salt mixture of from about 1:2 to about 50:1 by weight. Alternatively, the ratio of metal powder to metal salt mixture is about 15:1 by weight. Typically, the initiation of oxidation reaction between the metal salt mixture and the metal powder may take from about 5 minutes to about 1 hour and the metal oxide composition will be substantially dry at the end of the reaction from 30 minutes to 24 hours.

Alternatively, the process for making a metal oxide composition includes contacting the metal powder, metal salt, and aqueous solvent concurrently in a suitable vessel having an agitation device such that the metal salt, metal powder, and aqueous solvent are thoroughly mixed and an oxidation reaction is initiated. The reaction is conducted at ambient conditions and in a ratio of metal powder to metal salt mixture of from about 1:2 to about 50:1 by weight and a ratio of metal salt to solvent from about 20:1 to 1:20. As described before, the aqueous solvent is used to at least partially solubilize, or disperse, the metal salt initiating an oxidation reaction between the metal salt mixture and the metal powder. Similarly, the amount of aqueous solvent is limited so that the metal oxide composition does not become a slurry or solution. Typically, the initiation of oxidation reaction between the metal salt mixture and the metal powder may take from about 5 minutes to about 1 hour and the metal oxide composition will be substantially dry at the end of the reaction from 30 minutes to 24 hours.

The process for making a metal oxide composition of the present invention may also be adjusted to form a metal oxide composition that includes two or more metal oxides. One process may, for example, include reacting a metal salt mixture, such as a copper chloride and water mixture, with two or more distinct metal powders, such as zinc powder and iron powder, to form a metal oxide composition having two or more metals, such as an iron oxide/zinc oxide composition. In another alternative, the metal salt mixture, such as a copper chloride and water mixture, may be reacted with a first metal powder, such as iron powder, and then reacted with a second metal powder, such as a zinc powder, to form a metal oxide composition having two or more metals, such as an iron oxide/zinc oxide composition. In yet another alternative, the process may include contacting the metal salt mixture with a metal and a metal oxide powder or other non-reactive powders (not reactive to the metal salt) such that the resultant metal oxide composition include two or more metal oxides, basic metals, or incorporates other additives or combination. Such a process may, for example, include reacting a metal salt mixture, such as a copper chloride and water mixture, with a first metal powder, such as iron powder, and then reacting it with a metal oxide powder, such as iron oxide powder to form a metal oxide composition having a metal and a metal oxide mixture, such as an iron/iron oxide composition. Still another alternative, the basic metal powder, metal salt, and non-reactive powders and/or metal oxides are mixed together along with sufficient moisture to cause basic metal powder and metal salt to react and thereby incorporating the non-reactive powder and metal oxides into the final metal oxide composition. Non-reactive powders can be diatomaceous earth or clays (calcined or natural); or metals such as copper, titanium, gold, silver or alloys such as bronze, brass, stainless steels, etc.

As described above, the resultant metal oxide composition is a free-flowing powder and non-clumping powder, that is ready for use without further processing or drying. The resultant metal oxide composition may be used as is to remove contaminants from fluids. Conversely, the metal oxide composition may be coated onto a carrier or substrate. It should be noted that the density of the resulting metal oxide composition is similar to the density of commercially available pigments indicating a high surface area is created.

II. Coated Metal Oxide Substrate

The present invention is also directed to a process for making a tightly-adhered metal oxide composition coated substrate, wherein the metal oxide substrate composition comprises up to about 75% by final weight. Generally, the process for making a coated metal oxide substrate includes contacting a metal salt and an aqueous solvent to form a metal salt mixture, reacting a sufficient amount of the metal salt mixture with a metal powder to initiate the oxidation of the metal powder, contacting the metal powder and metal salt mixture, i.e. the oxidizing metal composition, with a substrate, and adding a sufficient amount of a second moistening agent to the metal oxide composition and substrate mixture to evenly coat the oxidizing metal oxide composition mixture onto the substrate. Most any substrate can be coated with the metal oxide composition can be used in the present invention. Even water or liquid sensitive substrates that would normally degrade or dissolve when exposed to an aqueous solution and/or heat or substrates that are initially soft or easily crushed may be used. It is believed, that as the metal oxide continues to oxidize around the wetted substrate, a tight bond or matrix is formed between the metal oxide particles and the substrate. As such, as the metal oxide coating increases the hardness of the substrate or its resistance to crushing. Suitable substrates include, but are not limited to, desiccation products, natural products, and synthetic products. Desiccation products include calcium chloride, calcium oxide, silica gel, silica-based beads, activated alumina, alumina-gel balls, activated bauxite, molecular sieves, raw or calcined natural zeolites, synthetic zeolites, and combinations thereof. Suitable natural products include raw or activated carbon, partially or fully calcined vermiculite, rock, raw or calcined clay, wood, coconut shell chip or coir, coal, raw or bloated shale, raw or calcined diatomaceous earth, and lime. Alternatively, the substrate may be an inert carrier material such as a calcined montmorillonite. The solvent may be the same solvent used to make the metal salt mixture or it may be different. Typically, for a water-sensitive substrate the moistening agent is an alcohol or similar non-aqueous liquid.

Any method of reacting the metal powder, metal salt mixture, moistening agent, and the substrate may be used so long as the moistening agent at least partially wets the surface of the substrate and the metal powder continues to oxidize forming a tight bond or matrix with the substrate as the metal oxide mixture continues oxidation. For example, the metal powder and metal salt mixture may be reacted with the substrate and a moistening agent in a suitable vessel having an agitation device, at ambient conditions, and in a ratio of metal powder to metal salt mixture of from about 1:2 to about 50:1 by weight and a ratio of metal salt to solvent from about 20:1 to 1:20, and a metal powder, metal salt, and solvent composition ratio of about 1:20 to 20:1. Typically, the metal powder, metal salt mixture, substrate, and second solvent are mixed or agitated for from about 5 minutes to about 6 hours. The coated metal oxide composition on the substrate is then allowed to oxidize at ambient conditions for from about 15 minutes to about 24 hours prior to use.

Alternatively, the process for making a coated metal oxide substrate includes mixing a metal salt, metal powder, and any other additives with a substrate concurrently and then adding the solvent while mixing at ambient conditions to form a coated metal oxide composition on a substrate. The ratio of metal powder to metal salt mixture of from about 1:2 to about 50:1 by weight a ratio of metal salt to solvent from about 20:1 to 1:20, with the metal oxide composition being about 5 to 75% by weight on the final product. Typically, the metal salt, solvent, metal powder, additives and a substrate are reacted for from about 5 minutes to about 16 hours. The coated metal oxide substrate is then allowed to further oxidize at ambient conditions for from about 8 hours to about 24 hours prior to use or packaging.

In another alternative, the process for making a coated metal oxide composition on a substrate of the present invention may be used to regenerate or re-coat a metal oxide substrate that already has a metal oxide coating or has been spent, i.e. the metal oxide coating is depleted. This simply involves the above process but the substrate has spent metal oxide coated on its surface. The same mixture or different mixtures may be used on the substrate with the recoated or spent metal oxide coating. This allows multiple metal oxide coatings and the continued use of the substrate reducing the cost of purchasing new coated metal oxide substrates and reducing the cost of disposing of the spent substrate thereby limiting the environment impact. It is also anticipated that sufficient metal or metal oxide content can be achieved on the new or used substrate making the final product attractive to recycle operations such as fertilizer blending operations or metal recovery.

Examples of the resultant tightly-adhered metal oxide composition coated substrate of the present invention include an iron oxide coated raw carbon, an iron oxide coated vermiculite, an iron oxide coated crushed rock, an iron oxide coated polished rock, an iron oxide coated calcined clay, a red iron oxide/iron oxide coated calcined clay, a black iron oxide/iron oxide coated calcined clay, an iron oxide coated wood saw dust, a zinc oxide coated lime, an iron oxide coated lime, an iron oxide coated calcium chloride, an iron oxide coated silica gel, an iron oxide/zinc oxide coated calcined clay, among others.

The resultant coated metal oxide substrate includes from about 5% to about 75% by weight metal oxide composition and from about 25% to about 95% by weight substrate. For example, an iron oxide coated calcinated montmorillonite substrate coated by the process of the present invention includes about 35% by weight iron oxide and 65% by weight calcinated montmorillonite. Alternatively, the coated metal oxide composition on a substrate of the present invention may be coated one or more additional times to produce a coated metal oxide composition on a substrate that includes more than 75% by weight metal oxide composition. Importantly, the substrate is coated. This essentially means that the substrate is completely covered with the metal oxide composition and that the composition is held in contact with the substrate, such that it does not readily separate from the substrate due to contact with a fluid stream. Further, the coatings can be found in the pores on the substrate. Practically speaking, coating means forming a nearly continuous layer around a substrate, with the coating held in contact with the substrate regardless of conditions. Furthermore, the coating is not readily removed upon contact with a fluid flowing in a reactor vessel. For example:

The flow rate of fluids through a column, are calculated by open bed (rising velocity of fluids in a column without material) of the following fluids:

| Fluid as Liquids | Open Bed Rising Fluid Velocity in Inches Per Minute | |
|---|---|---|
| | 10 C. or 50 F. | 38 C. or 100 F. |
| Water | 3.0 | 5.5 |
| Gasoline | 4.3 | 7.5 |
| Butane | 12 | 14 |
| Propane | 17 | 19 |

Under these flow rates the metal oxide composition is not removed.

The resultant coated metal oxide composition on a substrate has several uses. One use for the coated substrate is for sulfur removal, particularly $H_2S$ removal from fluids, such as natural gas. Typically, in this case a vessel is packed with the coated substrate and as the sulfur rich natural gas passes through the vessel the gas reacts with the oxide coating removing the sulfur from the natural gas and producing a sulfur free gas. Alternatively, the coated metal oxide substrate may be used for the reduction of $NO_x$, $SO_x$, $CO_x$, halogenated hydrocarbons, treatment of radioactive wastes, heavy metal removal or reduction, and catalytic reactions of hydrocarbons.

The following examples are simply intended to further illustrate and explain the present invention. The invention, therefore, should not be limited to any of the details in these examples.

EXAMPLES

Example 1

Metal Oxide Coated Raw Carbon

The following experiment was conducted to form an iron oxide coated granular raw carbon by the process of the present invention.

3 g of copper chloride dihydrate were added to 6 g of water to solubilize or partially dissolve the copper chloride dihydrate at ambient conditions. The metal salt mixture was then added to 75 g of commercial iron powder, mixed, and allowed to start oxidizing for about 15 minutes. 30 g of granular raw carbon (0.35 g/cc) were then added to the powder and mixed. 19 g of additional water were then added and mixed to bond the oxidizing powder to the carbon. The finished product was dried for 8 hours without additional processing.

The iron oxide coated carbon included 38% by weight iron or about 55% as iron oxide $Fe_2O_3$. The density of the iron oxide was 0.53 g/cc. The finished iron oxide coated carbon was hard and not easily broken or crushed as compared to the starting raw granular carbon.

Example 2

Metal Oxide Mixture on Granular Vermiculite

The following experiment was conducted to form an iron oxide coated granular vermiculite by the process of the present invention.

3 g of copper chloride dihydrate were added to 6 g of water to solubilize or partially dissolve the copper chloride dihydrate at ambient conditions. The metal salt mixture was then added to 75 g of commercial iron powder, mixed, and allowed to oxidize for about 15 minutes. 30 g of granular vermiculite (0.11 g/cc) were then added to the powder and mixed. 14 g of additional water were then added and mixed to affix the oxidized powder to the vermiculite. The finished product was dried for 8 hours without additional processing.

The iron oxide vermiculite included 59% by weight iron or about 84% as iron oxide $Fe_2O_3$. The density of the iron oxide was 0.23 g/cc. The finished iron oxide coated vermiculite was hard and not easily broken or crushed as compared to the starting raw granular vermiculite.

Example 3

Metal Oxide Mixture on Crushed Rock

The following experiment was conducted to form an iron oxide coated crushed rock by the process of the present invention.

3 g of copper chloride dihydrate were added to 6 g of water to solubilize or partially dissolve the copper chloride dihydrate at ambient conditions. The metal salt mixture was then added to 75 g of commercial iron powder, mixed, and allowed to oxidize for about 15 minutes. 250 g of crushed rock were then added to the powder and mixed. 9 g of additional water were then added and mixed to affix the oxidized powder to the rock. The finished product was dried for 12 hours and was ready for use without additional processing.

The iron oxide crushed rock included 22% by weight iron or about 31% as iron oxide $Fe_2O_3$.

Example 4

Metal Oxide on Polished Rock

The following experiment was conducted to form an iron oxide coated polished rock by the process of the present invention.

3 g of copper chloride dihydrate were added to 6 g of water to solubilize or partially dissolve the copper chloride dihydrate at ambient conditions. The metal salt mixture was then added to 75 g of commercial iron powder, mixed, and allowed to oxidize for about 15 minutes. 250 g of polished rock were then added to the powder and mixed. 9 g of additional water were then added and mixed to affix the oxidized powder to the rock. The finished product was dried for 12 hours and was ready for use without additional processing.

The iron oxide polished rock included 22% by weight iron or about 31% as iron oxide $Fe_2O_3$.

Example 5

Metal Oxide on Calcined Clay

An iron oxide coated calcined clay was tested for its ability to remove hydrogen sulfide from contaminated air.

3 g of copper chloride dihydrate were added to 6 g of water to solubilize or partially dissolve the copper chloride dihydrate at ambient conditions. The metal salt mixture was then added to 75 g of commercial iron powder, mixed, and allowed to oxidize for about 15 minutes. 100 g of calcined clay were then added to the powder and mixed. 50 g of additional water were then added and mixed to affix the oxidizing powder to the clay. The finished product was dried for 8 hours and was ready for use without additional processing.

The iron oxide coated calcined clay included 59% by weight iron or about 84% as iron oxide $Fe_2O_3$. The density of the iron oxide was 0.67 g/cc.

Example 6

$H_2S$ Removal Test

A 1-inch tube that was 30 inches long was filled with 185 g of the iron oxide coated calcined clay formed according to Example 5. Air with variable amounts of $H_2S$ was passed through the tube, from top to bottom, at a flow rate of 1 to 1.25 liters per minute (about 14 to 18 seconds total contact time).

The table below shows the removal of $H_2S$ during a total time of 54 hours. The amount of $H_2S$ in the inlet and outlet air was measured using gastec stain tubes.

| Time | Inlet $H_2S$ | Outlet | Wave Front (1) |
|---|---|---|---|
| 1 Hour | 30 ppm | 0 ppm | 2 inches |
| 2 Hours | 60 ppm | 0 ppm | 2 inches |
| 3 Hours | 700 ppm | 0 ppm | 3 inches |
| 5 Hours | 200 ppm | 0 ppm | 2 inches |
| 6 Hours | 200 ppm | 0 ppm | 2 inches |
| 7 Hours | 250 ppm | 0 ppm | 2 inches |
| 8 Hours | 1400 ppm | 0 ppm | 5 inches |
| 10 Hours | 400 ppm | 0 ppm | 3 inches |
| 12 Hours | 1400 ppm | 0 ppm | 5 inches |
| 18 Hours | 4500 ppm | 0 ppm | 10 inches |
| 22 Hours | 500 ppm | 0 ppm | 7 inches |
| 24 Hours | 3500 ppm | 0 ppm | 10 inches |
| 27 Hours | 3750 ppm | 0 ppm | 10 inches |
| 30 Hours | 1500 ppm | 0 ppm | 8 inches |
| 31 Hours | 700 ppm | 0 ppm | 5 inches |
| 32 Hours | 800 ppm | 0 ppm | 6 inches |
| 34 Hours | 800 ppm | 0 ppm | 6 inches |
| 40 Hours | 400 ppm | 0 ppm | 5 inches |
| 43 Hours | 200 ppm | 0 ppm | 4 inches |
| 44 Hours | 500 ppm | 0 ppm | 6 inches |
| 45 Hours | 200 ppm | 0 ppm | 5 inches |
| 46 Hours | 12000 ppm | 0 ppm | 20 inches |
| 48 Hours | 12000 ppm | 0 ppm | 21 inches |
| 51 Hours | 1400 ppm | 0 ppm | 12 inches |
| 52 Hours | 200 ppm | 0 ppm | 6 inches |
| 53 Hours | 500 ppm | 0 ppm | 7 inches |
| 54 Hours | 500 ppm | 0 ppm | 7 inches |

As the $H_2S$ reacted with the red iron oxide, it turned the iron oxide black, which illustrated the distance the $H_2S$ penetrated down the column. As the amount of $H_2S$ on the inlet increased, the distance the $H_2S$ penetrated the column increased. As the amount of $H_2S$ decreased, the distance the $H_2S$ penetrated the column was reduced as noted by the change in color of the media as it returned from black to red. Also, note that after 54 hours the $H_2S$ continued to be removed.

Example 7

Recoated Metal Oxide on Calcined Clay from Example 5

The following experiment was conducted to recoat the spent iron oxide coated calcinated clay from Example 5 by the process of the present invention.

3 g of copper chloride dihydrate were added to 6 g of water to solubilize or partially dissolve the copper chloride dihydrate at ambient conditions. The metal salt mixture was then added to 75 g of commercial iron powder, mixed, and allowed to oxidize for about 15 minutes. 120 g of used iron oxide coated calcined clay from Example 5 were then added to the powder and mixed. 27 g of additional water were then added and mixed to affix the oxidized powder to the calcined clay. The finished product was dried for 8 hours and was ready for use without additional processing.

The iron oxide recoated calcined clay included 60% by weight iron or about 85% as iron oxide $Fe_2O_3$ (not including previously coated iron oxide mixture). The density of the iron oxide was 0.8 g/cc.

Example 8

Iron Oxide/Red Iron Oxide on Calcined clay

The following experiment was conducted to form an iron oxide/red iron oxide coated calcined clay by using a metal powder, iron powder, and a metal oxide powder, red iron oxide powder.

2 g of copper chloride dihydrate were added to 4 g of water to solubilize or partially dissolve the copper chloride dihydrate at ambient conditions. The metal salt mixture was then added to 40 g of commercial iron powder, mixed, and allowed to oxidize for about 15 minutes. 40 g of red iron oxide powder were then added to the iron powder and mixed. 100 g calcined clay were then added to the commercial iron and red iron powder mixture and mixed. 33 g of additional water were then added and mixed to affix the oxidized powders to the clay. The finished product was dried for 84 hours and was ready for use without additional processing.

Example 9

Iron Oxide/Black Iron Oxide on Calcined Clay

The following experiment was conducted to form an iron oxide/black iron oxide coated calcined clay by using a metal powder, iron powder, and a metal oxide powder, black iron oxide powder.

2 g of copper chloride dihydrate were added to 4 g of water to solubilize or partially dissolve the copper chloride dihydrate at ambient conditions. The metal salt mixture was then added to 40 g of commercial iron powder, mixed, and allowed to oxidize for about 15 minutes. 40 g of black iron oxide powder were then added to the commercial iron powder and mixed. 100 g of calcined clay were then added to the commercial iron and black iron oxide powder mixture and mixed. 33 g of additional water were then added and mixed to affix the oxidized powders to the clay. The finished product was dried for 84 hours and was ready for use without additional processing.

Example 10

Metal Oxide on Wood Saw Dust

The following experiment was conducted to form an iron oxide coated wood sawdust by the process of the present invention.

3 g of copper chloride dihydrate were added to 6 g of water to solubilize or partially dissolve the copper chloride dihydrate at ambient conditions. The metal salt mixture was then added to 75 g of commercial iron powder, mixed, and allowed to oxidize for about 15 minutes. 20 g of wood saw dust were then added to the powder and mixed. 20 g of additional water were then added and mixed to affix the oxidized powder to the wood sawdust. The finished product was dried for 12 hours and was ready to break into smaller pieces for use without additional processing. The iron oxide coated wood included 63% by weight iron or about 90% as iron oxide $Fe_2O_3$. The density of the iron oxide was 1.3 g/cc.

Example 11A

Zinc on Pelletized Lime

The following experiment was conducted to form a zinc oxide coated pelletized lime by the process of the present invention.

2 g of copper chloride dihydrate were added to 3 g of water to solubilize or partially dissolve the copper chloride dihydrate at ambient conditions. The metal salt mixture was then added to 70 g of commercial zinc powder and mixed. The powder was then immediately added to 150 g of lime and mixed. 15 g of isopropanol were then added to the lime and powder mixture, mixed, and allowed to air-dry for 30 minutes. The iron oxide coated lime included 31% by weight zinc or about 38% as zinc oxide, ZnO.

Example 11B

Iron on Pelletized Lime

The following experiment was conducted to form an iron oxide coated pelletized lime by the process of the present invention.

3 g of copper chloride dihydrate were added to 6 g of water to solubilize or partially dissolve the copper chloride dihydrate at ambient conditions. The metal salt mixture was then added to 70 g of commercial iron powder, mixed, and allowed to oxidize for about 15 minutes. 150 g pelletized lime were then added to the powder and mixed. 15 g of isopropanol were then added to the powder and lime mixture and mixed to affix the oxidized powder to the lime. The finished product was dried for 3 hours and was ready for use without additional processing. The iron oxide coated lime included 31% by weight iron or about 44% as iron oxide $Fe_2O_3$.

Example 11C

Iron on Pelletized Calcium Chloride

The following experiment was conducted to form an iron oxide coated pelletized calcium chloride by the process of the present invention.

3 g of copper chloride dihydrate were added to 6 g of water to solubilize or partially dissolve the copper chloride dihydrate at ambient conditions. The metal salt mixture was then added to 70 g of commercial iron powder, mixed, and allowed to oxidize for about 15 minutes. 120 g of pelletized calcium were then added to the powder and mixed. 10 g of isopropanol were then added to the powder and calcium mixture and mixed to affix the oxidizing powder to the calcium in a partially opened container or bag. (Note—If pelletized calcium chloride was exposed to humid air or moisture for a few minutes, it would liquefy). The finished product was dried for 6 hours and was ready for use without additional processing.

Example 12A

Iron Oxide on Silica Gel

The following experiment was conducted to form an iron oxide coated silica gel by the process of the present invention.

3 g of copper chloride dihydrate were added to 6 g of water to solubilize or partially dissolve the copper chloride dihydrate at ambient conditions. The metal salt mixture was then added to 75 g of commercial iron powder, mixed, and allowed to oxidize for about 15 minutes. 150 g of silica gel were then added to the powder and mixed. 9 g of additional water were then added to the powder and gel mixture and mixed to affix the oxidized powder to the gel. The finished product was dried for 8 hours and was ready for use without additional processing.

Example 12B

Zinc Oxide on Silica Gel

The following experiment was conducted to form a zinc oxide coated silica gel by the process of the present invention.

1 g copper chloride dihydrate was added to 3 g of water to solubilize or partially dissolve the copper chloride dihydrate at ambient conditions. The metal salt mixture was then added to 75 g of commercial zinc powder and mixed. 150 g silica gel were added to the powder and mixed. 9 g of additional water were then added to the powder and gel mixture and mixed to bond the oxidized powder to the gel. The finished product was dried for 1 hour and was ready for use without additional processing.

Example 13A

Iron Oxide/Zinc Oxide on Calcined Clay

The following experiment was conducted to form an iron oxide/zinc oxide coated calcined clay by the process of the present invention. The iron powder and zinc powder were contacted with the copper chloride dihydrate and water mixture concurrently.

2.5 g copper chloride dihydrate were added to 5 g water to solubilize or partially dissolve the copper chloride dihydrate at ambient conditions. The metal salt mixture was then mixed into a mixture of 35 g of commercial zinc powder and 35 g of commercial iron powder. 100 g of calcined clay were then added to the powder mixture and mixed. 20 g of additional water were then added to the powder and clay mixture and mixed to affix the oxidized powders to the clay. The finished product was dried for 1 hour and was ready for use without additional processing.

The zinc acted as galvanizing where little red iron oxide could be seen when the basic zinc and iron were mixed, then oxidized. The product is a mixture of basic iron powder and zinc oxide coating on the substrate.

Example 13B

Iron Oxide/Zinc Oxide on Calcined Clay

The following experiment was conducted to form an iron oxide/zinc oxide coated calcined clay by the process of the present invention. The iron powder was first contacted with the copper chloride dihydrate and water mixture and then contacted with the zinc powder.

2.5 g of copper chloride dihydrate were added to 5 g of water to solubilize or partially dissolve the copper chloride dihydrate at ambient conditions. The metal salt mixture was then added to 35 g of commercial iron powder, mixed and allowed to oxidize for 15 minutes. 35 g commercial zinc powder were then added to the iron powder and mixed. 100 g of calcined clay were then added to the iron and zinc powder mixture and mixed. 20 g of additional water were added to the iron powder, zinc powder, and clay mixture and mixed to affix the oxidized powders to the gel. The finished product was dried for 3 hours and was ready for use without additional processing.

Some iron oxides could be seen when the basic iron was allowed to partially oxidize first. This product was a mixture of basic iron and iron oxides with zinc oxide coating on the substrate.

Example 13C

Iron Oxide/Zinc Oxide on Calcined Clay

The following experiment was conducted to form an iron oxide/zinc oxide coated calcined clay by the process of the present invention. The iron powder was first contacted with the copper chloride dihydrate and water mixture and then contacted with the calcined clay. The iron oxide coated calcined clay was then contacted with the zinc powder.

2.5 g of copper chloride dihydrate were added to 5 g of water to solubilize or partially dissolve the copper chloride dihydrate at ambient conditions. The metal salt mixture was then added to 35 g of commercial iron powder, mixed and allowed to oxidize for 15 minutes. 100 g of calcined clay were then added to the powder and mixed. 20 g of additional water were then added to the powder and clay mixture and mixed to affix the oxidized powder to the clay and let sit for 15 minutes. 35 g of commercial zinc powder was then added to the iron oxide coated clay and mixed. The finished product was dried for 3 hours and was ready for use without additional processing.

The basic iron oxidation was nearly complete and then basic zinc was applied and oxidized. This product was mostly iron oxide with possibly some basic iron with zinc oxide on the substrate.

As can be seen from the above example, the degree of oxidation of one or more metal powders in a basic metal mixture, was controlled to achieve varying degrees of metal oxidation, especially where one or more of the metals was catholically protective to one or more of the other basic metals present in the mixture.

Example 13D

Iron Oxide/Tin Oxide on Calcined Clay

The following experiment was conducted to form an iron oxide/tin oxide coated calcined clay by the process of the present invention. The iron powder and tin powder were contacted with the copper chloride dihydrate and water mixture concurrently.

4 g of copper chloride dihydrate were added to 6 g of water to solubilize or partially dissolve the copper chloride dihydrate at ambient conditions. The metal salt mixture was then added and mixed with a powder mixture of 35 g of commercial tin powder and 35 g commercial iron powder and allowed to oxidize for about 15 minutes. 100 g of calcined clay were then added to the powder mixture and mixed. 20 g of additional water were then added to the powder and clay mixture and mixed to affix the oxidized powders to the clay. The finished product was dried for 8 hours and was ready for use without additional processing.

The products produced according to the above examples were analyzed on the substrate to determine the composition make-up.

The phases constitute the majority components in the sample analyzed and possible secondary/trace phases likely in 2 to 5% by weight ranges.

Example 14

Best Matches from ICDD/ICSD Data Bases

Metal oxide compositions were produced from basic iron powder alone and in combination with added iron oxides, alone and on a substrate such as natural zeolite. Where a substrate was used, the coating was abraded to remove the metal oxide composition from the surface of the particles before analyzing. The compositions were mixed and allowed to oxidize for 24 hours before packaging for analysis.

An x-ray diffraction test was conducted by Evans Analytical Group using standard protocols.

| Sample | Primary Phases | Possible Secondary/Trace phases |
|---|---|---|
| 1B | FeO(OH) - Lepidocrocite Iron Oxide Hydroxide Orthorhombic Bbmm $Fe_3O_4$ - Magnetite Cubic Fd3m This sample is oxidized iron powder using the following formula: 50 grams iron powder 1 gram copper chloride 1 gram water | $Fe_8(O,OH)_{16}Cl_{1.3}$ - Akaganeite-M Monoclinic I2/m FeO(OH) - Goethite Orthorhombic Pbnm $Fe(OH,Cl)_{2.55}$ - Iron Chloride Hydroxide - Green Rust Rhombohedral R Fe - Iron Cubic Im3m |
| 2A | $Fe_3O_4$ - Magnetite Cubic Fd3m FeO(OH) - Goethite Orthorhombic Pbnm This sample is oxidized iron powder using the following formula: 25 grams iron powder 1 gram copper chloride 1 gram water 100 grams of granular zeolite 10 grams of water Note: metal oxide coating removed before analysis. | FeO(OH) - Lepidocrocite Iron Oxide Hydroxide Orthorhombic Bbmm $Fe_8(O,OH)_{16}Cl_{1.3}$ - Akaganeite-M Monoclinic I2/m $Fe(OH,Cl)_{2.55}$ - Iron Chloride Hydroxide - Green Rust Rhombohedral R Fe - Iron Cubic Im3m |

| Sample | Primary Phases | Possible Secondary/Trace phases |
|---|---|---|
| 3B | FeO(OH) - Goethite Orthorhombic Pbnm (Fe,Ni) -Taenite Cubic Fm3m This sample is oxidized iron powder using the following formula: 50 grams iron and nickel powder 1 gram copper sulfate 1 gram water | $Fe(OH,Cl)_{2.55}$ - Iron Chloride Hydroxide - Green Rust Rhombohedral R Fe - Iron Cubic Im3m $Ca(SO_4)(H_2O)_2$ - Gypsum Monoclinic C2/c $Fe_3O_4$ - Magnetite Cubic Fd3m |
| 4A | $Fe_3O_4$ - Magnetite Cubic Fd3m FeO(OH) - Goethite Orthorhombic Pbnm This sample is oxidized iron powder using the following formula: 25 grams iron powder 1 gram copper sulfate | FeO(OH) - Lepidocrocite Iron Oxide Hydroxide Orthorhombic Bbmm $Fe(OH,Cl)_{2.55}$ - Iron Chloride Hydroxide - Green Rust Rhombohedral R Fe - Iron |

| Sample | Primary Phases | Possible Secondary/Trace phases |
|---|---|---|
|  | 1 gram water 100 grams of granular zeolite 10 grams of water Note: metal oxide coating removed before analysis. | Cubic Im3m PDF# 00-006-0696 |

| Sample | Primary Phases | Possible Secondary/Trace phases |
|---|---|---|
| 4B | $Fe_3O_4$ - Magnetite Cubic Fd3m This sample is oxidized iron powder and synthetic iron oxide mix using the following formula: 12.5 grams iron powder 12.5 grams synthetic magnetite 1 gram copper chloride 1 gram water 100 grams of granular zeolite 10 grams of water Note: metal oxide coating removed before analysis. | FeO(OH) - Lepidocrocite Iron Oxide Hydroxide Orthorhombic Bbmm FeO(OH) - Goethite Orthorhombic Pbnm $Fe(OH,Cl)_{2.55}$ - Iron Chloride Hydroxide - Green Rust Rhombohedral R $Fe_8(O,OH)_{16}Cl_{1.3}$ - Akaganeite-M Monoclinic I2/m Fe- Iron Cubic Im3m |
| 5A | $Fe_3O_4$ - Magnetite Cubic Fd3m FeO(OH) - Goethite Orthorhombic Pbnm This sample is oxidized iron powder and natural iron oxide mix using the following formula: 12.5 grams iron powder 12.5 grams natural magnetite 1 gram copper chloride 1 gram water 100 grams of granular zeolite 10 grams of water Note: metal oxide coating removed before analysis. | FeO(OH) - Lepidocrocite Iron Oxide Hydroxide Orthorhombic Bbmm $Fe_8(O,OH)_{16}Cl_{1.3}$ - Akaganeite-M Monoclinic I2/m $Fe(OH,Cl)_{2.55}$ - Iron Chloride Hydroxide - Green Rust Rhombohedral R Fe- Iron Cubic Im3m |

| Sample | Primary Phases | Possible Secondary/Trace phases |
|---|---|---|
| 5B | $Fe_3O_4$ - Magnetite Cubic Fd3m FeO(OH) - Lepidocrocite Iron Oxide Hydroxide Orthorhombic Bbmm $Fe_8(O,OH)_{16}Cl_{1.3}$ - Akaganeite-M Monoclinic I2/m $Fe(OH,Cl)_{2.55}$ - Iron Chloride Hydroxide - Green Rust Rhombohedral R This sample is oxidized iron powder and iron oxide mix using the following formula: 12.5 grams iron powder 10 grams synthetic magnetite 10 grams natural magnetite 1 gram copper chloride 1 gram water 100 grams of granular zeolite 10 grams of water Note: metal oxide coating removed before analysis. | FeO(OH) - Goethite Orthorhombic Pbnm Fe - Iron Cubic Im3m |
| 6 | $Fe_3O_4$ - Magnetite Cubic Fd3m FeO(OH)-Goethite Orthorhombic Pbnm | $Fe(OH,Cl)_{2.55}$ - Iron Chloride Hydroxide - Green Rust |

-continued

| Sample | Primary Phases | Possible Secondary/ Trace phases |
|---|---|---|
| | This sample is oxidized iron powder and iron oxide mix using the following formula:<br>12.5 grams iron powder<br>10 grams synthetic magnetite<br>10 grams natural magnetite<br>1 gram copper sulfate<br>1 gram water<br>100 grams of granular zeolite<br>10 grams of water<br>Note: metal oxide coating removed before analysis. | Rhombohedral R<br>$Ca(SO_4)(H_2O)_2$ - Gypsum<br>Monoclinic C2/c<br>Possible:<br>$Fe_2Si_2O_5(OH)_4 \times 2H_2O$ - Hisingerite<br>Monoclinic P |

| Sample | Primary Phases | Possible Secondary/ Trace phases |
|---|---|---|
| 7A | $Fe_3O_4$ - Magnetite<br>Cubic Fd3m<br>This sample is oxidized iron powder and iron oxide mix using the following formula:<br>12.5 grams iron powder<br>12.5 grams metal phosphate<br>1 gram copper chloride<br>1 gram water<br>100 grams of granular zeolite<br>10 grams of water<br>Note: metal oxide coating removed before analysis. | FeO(OH) - Goethite<br>Orthorhombic Pbnm<br>$Ca(SO_4)(H_2O)_2$ - Gypsum<br>Monoclinic C2/c<br>$Fe(OH,Cl)_{2.55}$ -<br>Iron Chloride Hydroxide - Green Rust<br>Rhombohedral R<br>Possible Trace:<br>$CaAl_2Si_2O_8 \times 4H_2O$ - Gismondine<br>Monoclinic P21/c<br>Heulandite -<br>$CaKAlSiO \times H2O$<br>Monoclinic C2/m<br>$Fe_8(O,OH)_{16}Cl_{1.3}$ - Akaganeite-M<br>Monoclinic I2/m<br>$Fe_3O_4$ - Magnetite<br>Cubic Fd3m |
| 8 | FeO(OH) - Lepidocrocite<br>Iron Oxide Hydroxide<br>Orthorhombic Bbmm<br>FeO(OH) - Goethite<br>Orthorhombic Pbnm<br>$Fe(OH,Cl)_{2.55}$ - Iron Chloride Hydroxide - Green Rust<br>Rhombohedral R<br>This sample is oxidized iron powder and iron oxide mix using the following formula:<br>12.5 grams iron powder<br>12.5 grams metal phosphate<br>100 grams of granular zeolite<br>10 grams of water<br>Note: metal oxide coating removed before analysis. | |

The table above lists the compounds identified with highest figure of merit from the ICDD/ICSD data bases. Although the basic phases are similar for the set of samples, the relative amounts of the phases differ significantly for the individual samples. In order to emphasize this, the table above is separated into two columns. The first column lists the primary phase, and the second column lists secondary and trace phases. Typically, primary phases are responsible for >70% of the total diffraction intensity.
Note that, given the complexity of the XRD patterns, it is possible that some trace phases were not identified. Also, in many cases, the (OH) and Cl are substitutable into the matrix, and without elemental analysis verifying the presence of Cl, the actual formulas may have (OH) groups present instead of Cl.
Note that the NMR readings are excluded.

The invention illustratively disclosed herein suitably may be practiced in the absence of any element, which is not specifically disclosed herein. It is apparent to those skilled in the art, however, that many changes, variations, modifications, other uses, and applications to the method are possible, and also changes, variations, modifications, other uses, and applications which do not depart from the spirit and scope of the invention are deemed to be covered by the invention, which is limited only by the claims which follow.

What is claimed is:

1. A process for making a metal oxide coated substrate, the process consisting of:
   a. contacting a metal salt with a first aqueous solvent to form a metal salt mixture, wherein the ratio of metal salt to solvent is from 20:1 to 1:4 by weight;
   b. reacting a sufficient amount of the metal salt mixture with at least one metal powder in a zero valence state at ambient conditions to initiate an oxidizing reaction between the metal powder and the metal salt mixture to form an oxidizing mixture;
   c. contacting the oxidizing mixture with a substrate, wherein the ratio of metal powder to substrate is at most 10:1; and,
   d. adding a sufficient amount of a second solvent to moisten the substrate and adhere the oxidizing mixture onto the substrate wherein the oxidizing reaction substantially proceeds forming a metal oxide coated substrate comprising from at least 5% to 75% by weight metal oxide.

2. The process of claim 1, wherein the metal salt is selected from the group consisting of metal chloride, carbonate, sulfate, acetate, nitrate, chelate, phosphate, oxide, and combinations thereof.

3. The process of claim 2 wherein the metal salt is selected from the group consisting of: copper chloride, iron chloride, sodium chloride, nickel chloride, manganese chloride, magnesium chloride, copper sulfate, iron sulfate, zinc sulfate, nickel sulfate, manganese sulfate, magnesium sulfate, zinc phosphate, nickel phosphate, iron phosphate, aluminum phosphate, titanium oxide, magnesium phosphate, and combinations thereof.

4. The process of claim 1, wherein the first aqueous solvent is selected from the group consisting of water and a water/alcohol mixture.

5. The process of claim 1, wherein the metal powder is selected from the group 2A, 3B, 4B, 5B, 6B, 7B, 8, 1B, 2B, 3A, 4A, 5A, metals and combinations thereof.

6. The process of claim 5 wherein the metal powder is selected from the group consisting of: iron powder, zinc powder, tin powder, aluminum powder, antimony powder, magnesium powder, titanium powder, manganese powder, chromium powder, nickel powder, cobalt powder, platinum powder and combinations thereof.

7. The process of claim 1, wherein the ratio of metal salt mixture to metal powder is from about 5:1 to about 1:20 by weight.

8. The process of claim 1, wherein the metal salt and the first aqueous solvent are contacted for from about 5 seconds to about 10 minutes.

9. The process of claim 1, wherein the ratio of metal powder and metal salt mixture to substrate to the second solvent is from about 20:1:10 to about 10:30:1 by weight.

10. The process of claim 1, wherein the metal salt mixture and the metal powder are reacted for from about 15 minutes to about 24 hours.

11. The process of claim 1, wherein the substrate is at least one desiccation product.

12. The process of claim 11, wherein the desiccation products are selected from the group consisting of calcium chloride, calcium oxide, silica gel, silica-based beads, activated alumina, alumina-gel balls, activated bauxite, molecular sieves, natural zeolites, synthetic zeolites, and combinations thereof.

13. The process of claim 1, wherein the substrate is selected from the group consisting of carbon, vermiculite, rock, calcinated clay, wood, coconut shell chip or coir, coal, shale, diatomaceous earth, and lime.

14. The process of claim 1, wherein the substrate is calcinated montmorillonite.

15. The process of claim 1, wherein the second solvent is selected from the group consisting of water, alcohol, hydrocarbons, halogenated hydrocarbons, and combinations thereof.

16. The process of claim 1, wherein the metal powder and metal salt mixture, the substrate, and the second solvent are contacted for from about 15 minutes to about 24 hours.

17. The process of claim 1, wherein the substrate is a spent metal oxide coated substrate.

18. The process of claim 1, wherein the metal salt mixture is reacted with a second metal powder.

19. The process of claim 18, wherein the second metal powder is a metal powder in a zero valence state or is a metal oxide powder.

20. A process for making a metal oxide coated substrate, the process comprising:
  a. reacting a metal salt with a metal powder in a zero valence state, the metal powder selected from the group consisting of iron powder, zinc powder, tin powder, aluminum powder, manganese powder, magnesium powder, antimony powder, and combinations thereof, and a sufficient amount of a first aqueous solvent to initiate an oxidizing reaction between the metal powder and the metal salt to form an oxidizing mixture; and,
  b. contacting the oxidizing mixture with a substrate and a sufficient amount of a second aqueous solvent to physically adhere the oxidizing metal oxide onto the substrate, wherein the oxidizing reaction substantially proceeds forming a metal oxide coated substrate comprising from at least 5% to 75% by weight metal oxide and having a finished metal oxide coated substrate of a density of less than about 1 gram/cubic centimeter.

21. The process of claim 20, wherein the substrate is at least one desiccation product.

22. The process of claim 20, wherein the substrate is selected from the group consisting of calcium chloride, calcium oxide, silica gel, silica-based beads, activated alumina, alumina-gel balls, activated bauxite, molecular sieves, natural zeolites, synthetic zeolites, and combinations thereof.

23. The process of claim 20, wherein the substrate is selected from the group consisting of carbon, vermiculite, rock, clay, wood, coconut shell chip or coir, coal, shale, diatomaceous earth, zeolites, and lime.

* * * * *